United States Patent

[11] 3,568,809

[72] Inventor John Alexander Macdonald
 138 Kangaroo Point Road, Sylvania, New South Wales, Australia
[21] Appl. No. 750,098
[22] Filed Aug. 5, 1968
[45] Patented Mar. 9, 1971

[54] CONVEYOR
 6 Claims, 5 Drawing Figs.
[52] U.S. Cl. ................................................ 193/35, 198/114
[51] Int. Cl. ................................................ B65g 13/11
[50] Field of Search ......................................... 193/35, 37; 198/113—115, 139

[56] References Cited
 FOREIGN PATENTS
 309,267 4/1929 Great Britain ................ 193/35

Primary Examiner—Evon C. Blunk
Assistant Examiner—Alfred N. Goodman
Attorney—Holman & Stern ABSTRACT: A conveyor having a plurality of rolls between sections of the conveyor which sections are arranged so that the conveyor will support a load applied in first direction but may be rolled up into a roll for easy transport by a force applied in a direction opposite to said first direction.

PATENTED MAR 9 1971

3,568,809

Inventor:
John Alexander MacDonald
BY _____ Agent

CONVEYOR

This invention relates to a roller conveyor of the rollup type which may be readily transported from place to place.

The present invention has been devised for use as a versatile conveyor, for example for unloading from motor vehicles on delivery runs. It may be rolled up into a roll and is light enough in construction to permit ready operation by one man. By virtue of its construction it may also be used as a rollabout member whereby it forms a truck surface for the conveyance of goods.

In accordance with the present invention there is provided a conveyor comprising spaced sections formed of sideplates and connecting plates, the sideplates being pivotally connected at one end to an adjacent pair of connecting plates and at the other end being fixedly connected to another pair of adjacent connecting plates, the adjacent ends of adjacent side plates having formations in contact with each other that permit the conveyor to resist a force in one direction but to be rolled up by the application of a force in a direction opposite to the first-mentioned direction.

The invention is hereinafter described by way of an example with reference to the accompanying drawing in which.

Figure 1:
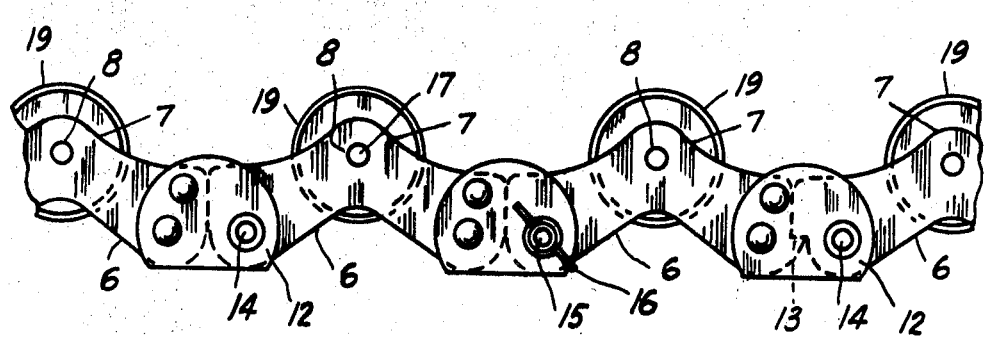
FIG. 1 is a side elevation of exemplary conveyor according to this invention.
Figure 2:
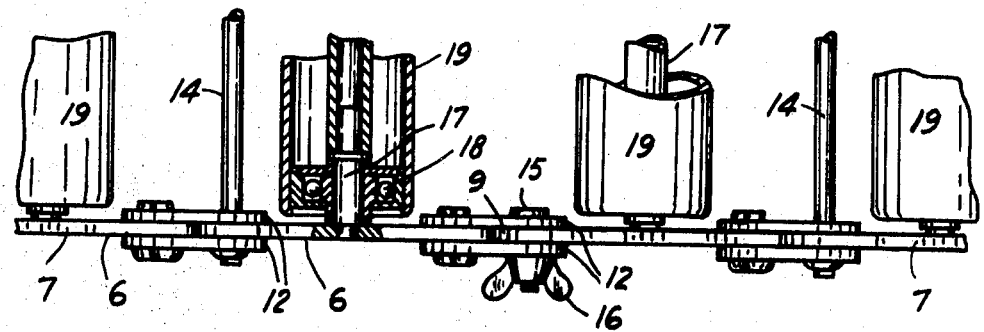
FIG. 2 is a fragmentary plan view of the conveyor of FIG. 1.
Figure 3:
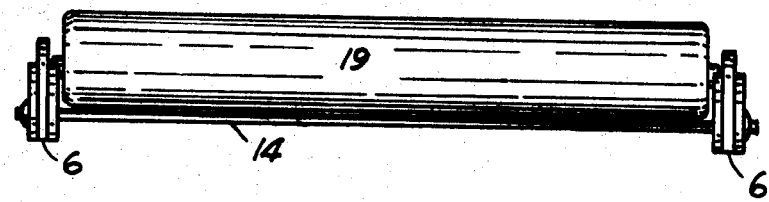
FIG. 3 is an end elevation of the conveyor of FIG. 1.
Figures 4, 5:
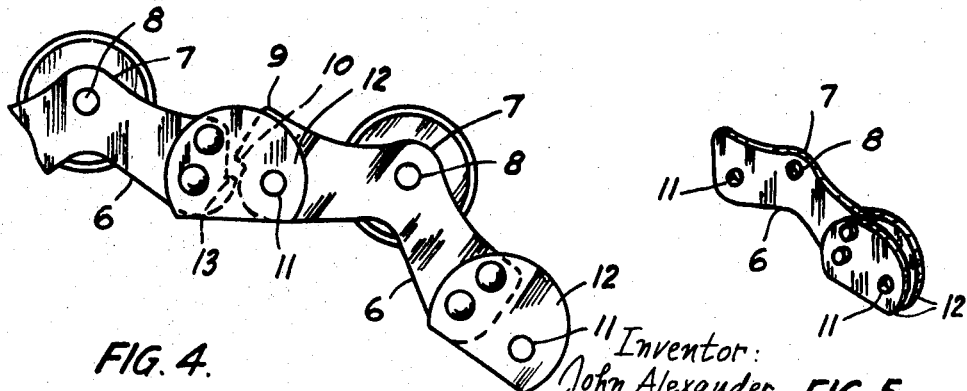
FIG. 4 is a side elevation similar to FIG. 1 but showing the rollup arrangement.
FIG. 5 is a perspective view of one of the connecting members of the conveyor of FIG. 1.

The conveyor is built up of sections comprising a sideplate 6 which has in elevation a raised apex 7 with an aperture 8 to receive a roller shaft 17. At one end the sideplate 6 has riveted thereto side-by-side connecting plates 12. At the other end the plate 6 has an aperture 11 which corresponds in position to an aperture also marked 11 in the connecting plates for receiving a connecting member so that a series of side plates with connecting member connecting plates may be built up to form a length of conveyor. The sideplates 6 are shaped to rest on a supporting surface and support the conveyor.

The connecting member may be a spacer rod 14 with securing means on its end or a wingnut 16 and bolt 15. The sideplates 6 at adjacent ends are provided with formations so that the assembled conveyor will normally be flat in one position, as shown in FIG. 1, but will roll up when turned over. These formations may be as shown with reference numeral 9, or a stepped formation 10 and 13 on each cooperating end may be provided.

The conveyor sections are spaced apart by the spacer rods 14 and by rollers 19 which may be of plastic tubing and are journaled on the shafts 17 by means of bearings 18.

The sideplates 6 and connecting members 14 are normally fabricated from steel or aluminum pressings but may be formed of cast or die-cast metal in which case they are formed as an integral structure.

I claim:

1. A conveyor comprising spaced sections formed of sideplates and connecting plates, the sideplates being pivotally connected at one end to an adjacent pair of connecting plates and at the other end being fixedly connected to another pair of adjacent connecting plates, the adjacent ends of adjacent sideplates having formations in contact with each other that permit the conveyor to resist a force in one direction but to be rolled up by the application of a force in a direction opposite to the first-mentioned direction.

2. A conveyor as claimed in claim 1 wherein the sideplates have a complementary stepped formation at adjacent ends.

3. A conveyor as claimed in claim 1 wherein the sideplates are angular in shape with an aperture located at the apex of each plate for receiving a shaft supporting a roller extending between the sections.

4. A conveyor as claimed in claim 1 wherein the pivotal connection between the sideplates and the connecting members is a shaft extending between the sections.

5. A conveyor as claimed in claim 1 wherein the connecting plates are shaped to form a supporting surface for the conveyor.

6. A conveyor as claimed in claim 1 wherein the sideplates and the connecting plates are formed as an integral casting.